(12) United States Patent
Brown et al.

(10) Patent No.: US 11,089,464 B2
(45) Date of Patent: Aug. 10, 2021

(54) METHODS AND DEVICES FOR FACILITATING BLUETOOTH PAIRING USING A CAMERA AS A BARCODE SCANNER

(71) Applicant: BLACKBERRY LIMITED, Waterloo (CA)

(72) Inventors: Michael Stephen Brown, Kitchener (CA); Herbert Anthony Little, Waterloo (CA)

(73) Assignee: BLACKBERRY LIMITED, Waterloo (CA)

( * ) Notice: Subject to any disclaimer, the term of this patent is extended or adjusted under 35 U.S.C. 154(b) by 0 days.

(21) Appl. No.: 16/847,012

(22) Filed: Apr. 13, 2020

(65) Prior Publication Data

US 2020/0245117 A1    Jul. 30, 2020

Related U.S. Application Data

(63) Continuation of application No. 15/245,285, filed on Aug. 24, 2016, now Pat. No. 10,623,934, which is a
(Continued)

(51) Int. Cl.
*H04B 7/00* (2006.01)
*H04W 4/80* (2018.01)
(Continued)

(52) U.S. Cl.
CPC .............. *H04W 4/80* (2018.02); *G06F 21/35* (2013.01); *G06F 21/44* (2013.01); *G06K 9/0004* (2013.01); *G06K 19/06028* (2013.01); *G06K 19/06037* (2013.01); *G06K 19/06112* (2013.01); *H04N 1/00347* (2013.01); *H04N 1/327* (2013.01); *H04N 1/32789* (2013.01); *H04W 4/08* (2013.01); *H04W 8/186* (2013.01); *H04W 8/26* (2013.01); *H04W 12/04* (2013.01); *H04W 12/50* (2021.01); *H04W 76/14* (2018.02); *G06F 2221/2103* (2013.01); *H04N 2101/00* (2013.01);
(Continued)

(58) Field of Classification Search
CPC ...... H04W 76/023; H04W 8/26; H04W 4/008; G06K 19/0612; H04N 1/327; H04N 1/32789
USPC .... 455/41.2, 41.1, 41.3, 466, 566, 411, 558, 455/556.1, 557, 410
See application file for complete search history.

(56) References Cited

U.S. PATENT DOCUMENTS 6,944,480 B2 *  9/2005  Tanaka ................... G06F 1/3265
                                                                  455/566
7,403,744 B2 *  7/2008  Bridgelall .............. H04W 4/203
                                                                  340/10.1
(Continued)

*Primary Examiner* — Marceau Milord
(74) *Attorney, Agent, or Firm* — Perry + Currier

(57) ABSTRACT

Embodiments of the systems, devices and methods described herein generally facilitate performing Bluetooth pairing between a first device and a second device. In accordance with one example embodiment, a first device generates a barcode that encodes Bluetooth pairing data for transmission to the second device, wherein the pairing data comprises a Bluetooth address associated with the first device, and wherein the pairing data further comprises a personal identification number usable to complete the Bluetooth pairing, the barcode is transmitted to the second device, and Bluetooth pairing is performed with the second device.

20 Claims, 7 Drawing Sheets

Related U.S. Application Data continuation of application No. 14/877,346, filed on Oct. 7, 2015, now Pat. No. 9,467,802, which is a continuation of application No. 14/529,681, filed on Oct. 31, 2014, now Pat. No. 9,185,735, which is a continuation of application No. 12/572,386, filed on Oct. 2, 2009, now Pat. No. 8,879,994.

(51) Int. Cl.
| | | |
|---|---|---|
| *H04W 76/14* | (2018.01) | |
| *H04N 1/00* | (2006.01) | |
| *H04N 1/327* | (2006.01) | |
| *H04W 8/18* | (2009.01) | |
| *H04W 8/26* | (2009.01) | |
| *H04W 12/50* | (2021.01) | |
| *H04W 4/08* | (2009.01) | |
| *H04W 12/04* | (2021.01) | |
| *G06K 19/06* | (2006.01) | |
| *G06F 21/35* | (2013.01) | |
| *G06F 21/44* | (2013.01) | |
| *G06K 9/00* | (2006.01) | |
| *H04N 101/00* | (2006.01) | |
| *H04W 84/18* | (2009.01) | |
| *H04W 12/77* | (2021.01) | |

(52) U.S. Cl.
CPC .............. *H04N 2201/0015* (2013.01); *H04N 2201/0027* (2013.01); *H04N 2201/0041* (2013.01); *H04N 2201/0055* (2013.01); *H04N 2201/0084* (2013.01); *H04N 2201/0086* (2013.01); *H04N 2201/0089* (2013.01); *H04W 12/77* (2021.01); *H04W 84/18* (2013.01)

(56) References Cited

U.S. PATENT DOCUMENTS

| | | | | |
|---|---|---|---|---|
| 7,826,395 | B2 * | 11/2010 | Kim | H04L 12/282 370/254 |
| 7,857,225 | B2 * | 12/2010 | Challa | G06K 7/1095 235/462.45 |
| 8,879,994 | B2 * | 11/2014 | Brown | G06K 9/0004 455/41.3 |
| 9,185,735 | B2 * | 11/2015 | Brown | H04W 12/003 |
| 9,467,802 | B2 * | 10/2016 | Brown | H04W 4/08 |
| 10,623,934 | B2 * | 4/2020 | Brown | G06F 21/35 |
| 2004/0253923 | A1 * | 12/2004 | Braley | H04L 61/00 455/41.2 |
| 2005/0085188 | A1 * | 4/2005 | Ishii | H04M 1/72409 455/41.2 |
| 2006/0116107 | A1 * | 6/2006 | Hulvey | H04W 12/02 455/411 |
| 2006/0135064 | A1 * | 6/2006 | Cho | H04W 4/21 455/41.1 |
| 2016/0366542 | A1 | 12/2016 | Brown et al. | |

\* cited by examiner

METHODS AND DEVICES FOR FACILITATING BLUETOOTH PAIRING USING A CAMERA AS A BARCODE SCANNER

CROSS-REFERENCE TO RELATED APPLICATIONS

This application is a continuation of U.S. patent application Ser. No. 15/245,285, filed Aug. 24, 2016, the contents of which is incorporated herein by reference.

FIELD

Embodiments described herein relate generally to the display of a barcode at an electronic device, and more specifically to the display of a barcode at an electronic device for capture by another device.

BACKGROUND

A barcode is an optical representation of data, as known in the art. For example, a typical "1-dimensional" barcode may be represented by a series of lines of varying widths and spacing. As a further example, a "2-dimensional" barcode may be represented by squares, dots, hexagons or other geometric patterns. A barcode may be a black-and-white barcode. Alternatively, a barcode may be a color barcode.

BRIEF DESCRIPTION OF THE DRAWINGS

For a better understanding of embodiments of the systems and methods described herein, and to show more clearly how they may be carried into effect, reference will be made, by way of example, to the accompanying drawings in which.

DETAILED DESCRIPTION

Some embodiments of the systems and methods described herein make reference to a mobile device. A mobile device may be a two-way communication device with advanced data communication capabilities having the capability to communicate with other computer systems. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities), for example. A mobile device may communicate with other devices through a network of transceiver stations.

Figure 1:
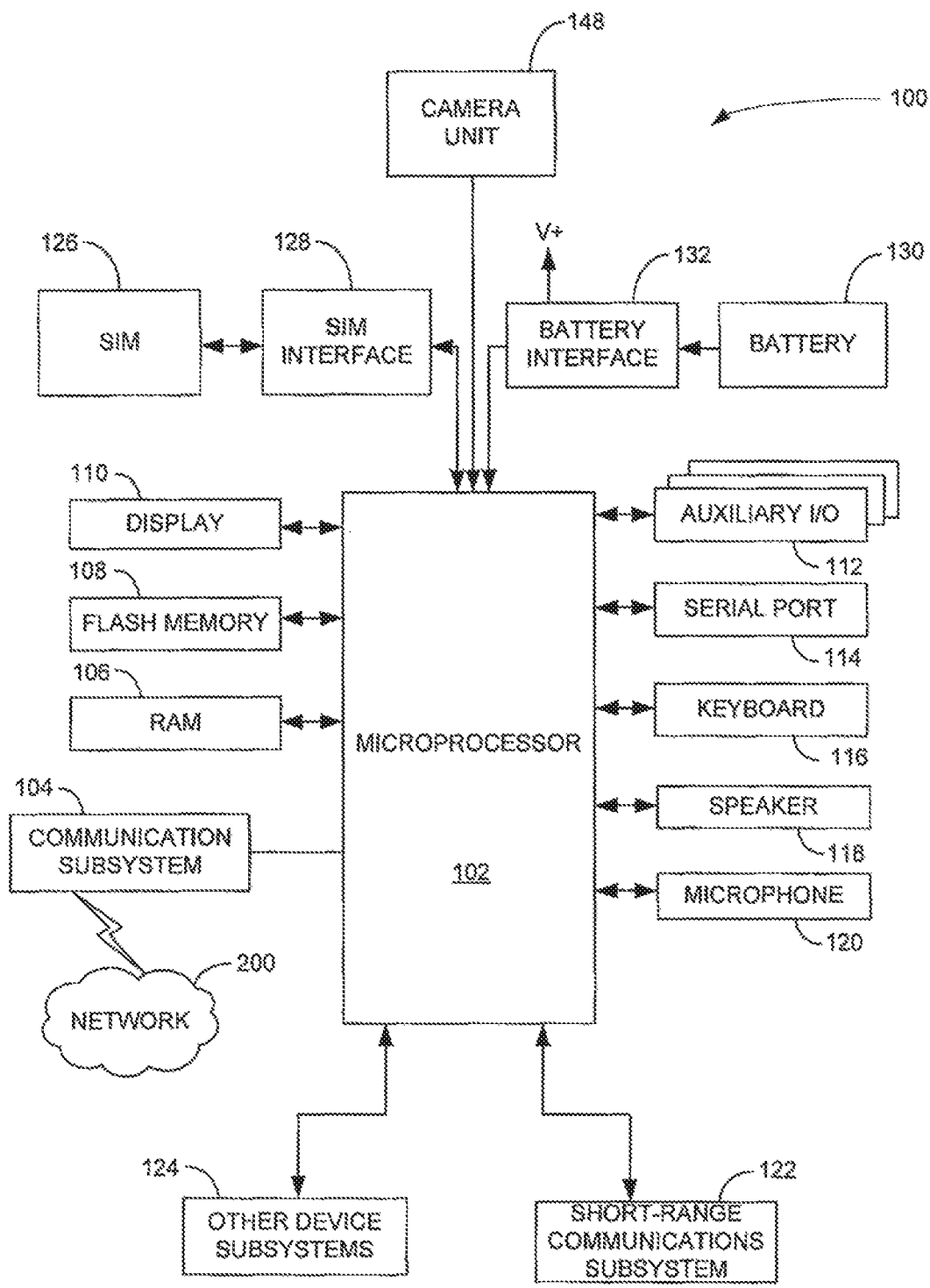
FIG. 1 is a block diagram of a mobile device in one example implementation.
Figure 2:
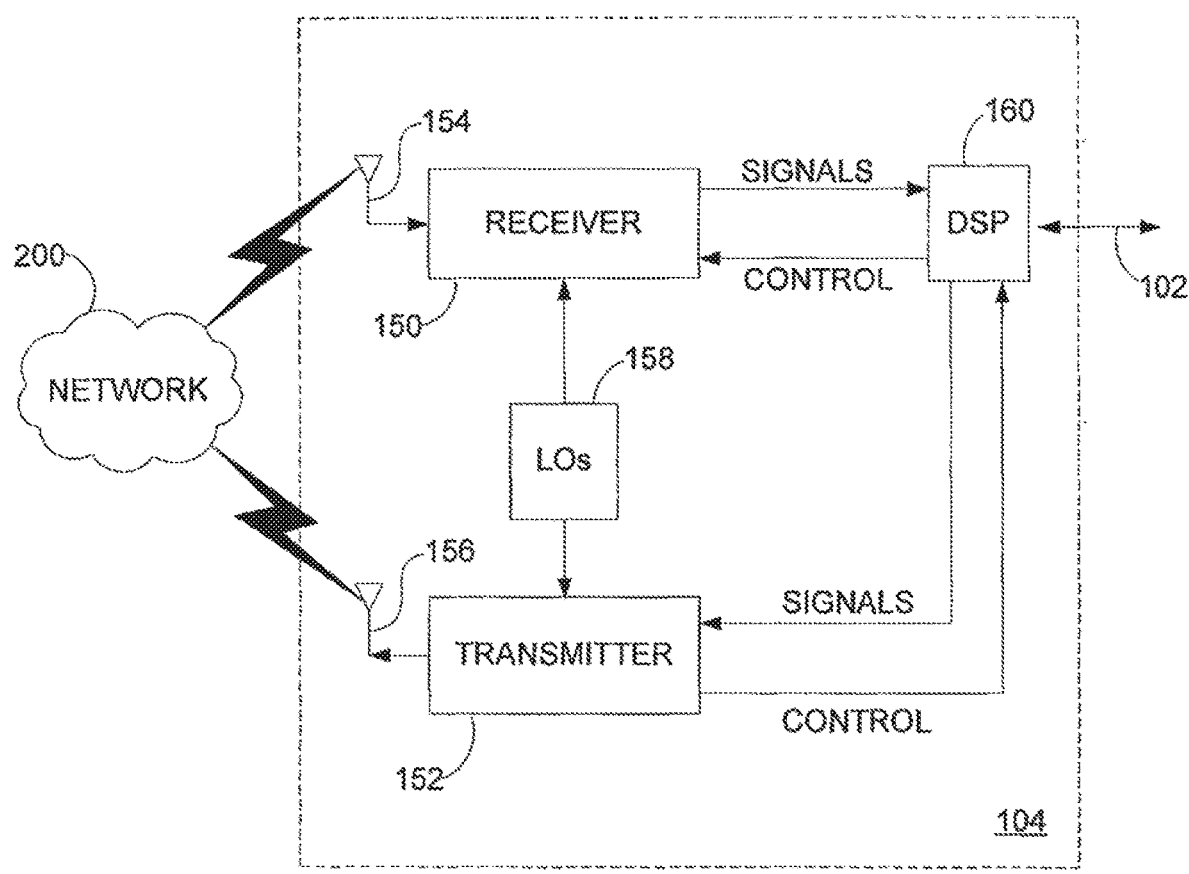
FIG. 2 is a block diagram of a communication subsystem component of the mobile device of FIG. 1.
Figure 3:
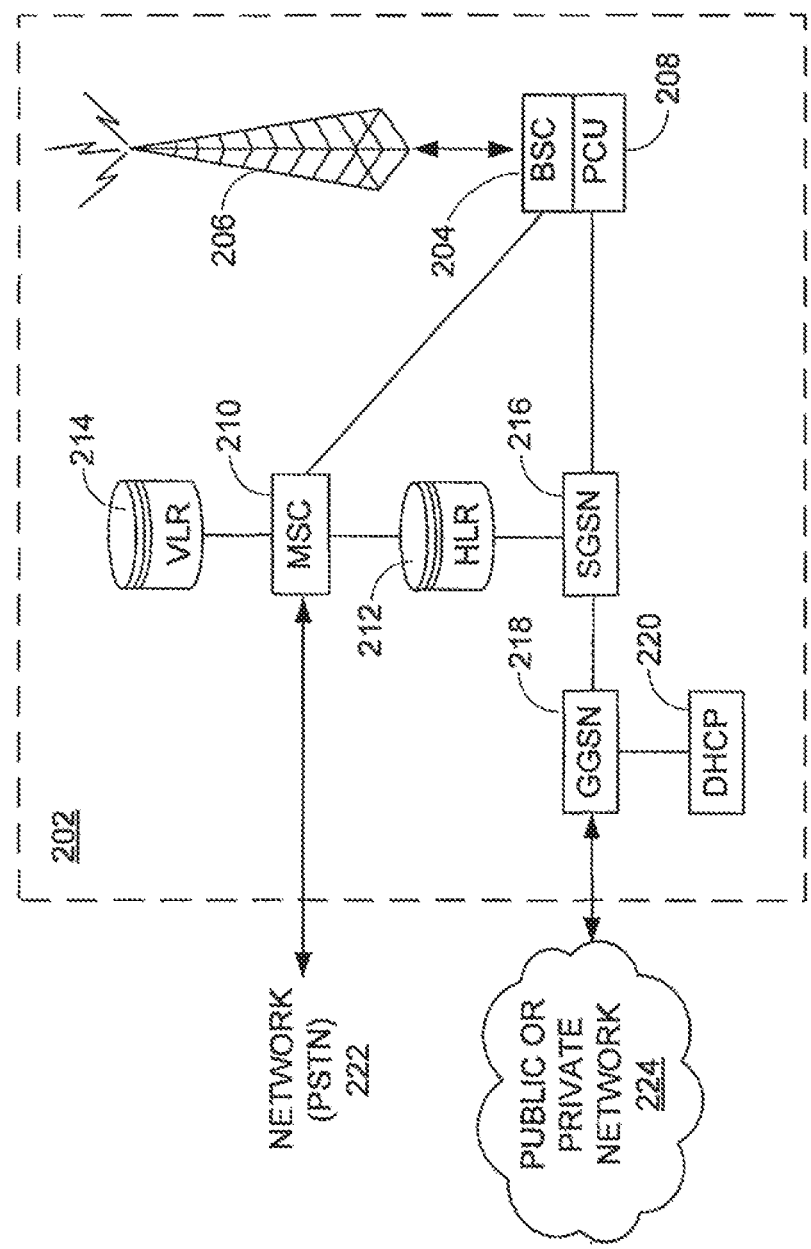
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, may be performed through communication subsystem 104. Communication subsystem 104 may be configured to receive messages from and send messages to a wireless network 200. In one example implementation of mobile device 100, communication subsystem 104 may be configured in accordance with the Global System for Mobile Communication (GSM) and General Packet Radio Services (GPRS) standards. The GSM/GPRS wireless network is used worldwide and it is expected that these standards may be supplemented or superseded eventually by Enhanced Data GSM Environment (EDGE) and Universal Mobile Telecommunications Service (UMTS), and Ultra Mobile Broadband (UMB), etc. New standards are still being defined, but it is believed that they will have similarities to the network behavior described herein, and it will also be understood by persons skilled in the art that the embodiments of the present disclosure are intended to use any other suitable standards that are developed in the future. The wireless link connecting communication subsystem 104 with network 200 may represent one or more different Radio Frequency (RF) channels, operating according to defined protocols specified for GSM/GPRS communications. With newer network protocols, these channels may be capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems. Other network communication technologies that may be employed include, for example, Integrated Digital Enhanced Network (DEN™), Evolution-Data Optimized (EV-DO), and High Speed Packet Access (HSPA), etc.

Microprocessor 102 may also interact with additional subsystems such as a Random Access Memory (RAM) 106, flash memory 108, display 110, auxiliary input/output (I/O) subsystem 112, serial port 114, keyboard 116, speaker 118, microphone 120, camera unit 148, short-range communications subsystem 122 and other device subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, as well as device-resident functions such as a calculator or task list. Operating system software used by microprocessor 102 is typically stored in a persistent store such as flash memory 108, which may alternatively be a read-only memory (ROM) or similar storage element (not shown). Those skilled in the art will understand that the operating system, specific device applications, or parts thereof, may be temporarily loaded into a volatile store such as RAM 106.

Mobile device 100 may send and receive communication signals over network 200 after network registration or activation procedures have been completed. Network access may be associated with a subscriber or user of a mobile device 100. To identify a subscriber, mobile device 100 may provide for a Subscriber Identity Module ("SIM") card 126 (or e.g. USIM for UMTS, or CSIM or RUIM for CDMA) to be inserted in a SIM interface 128 in order to communicate with a network. SIM 126 may be one example type of a conventional "smart card" used to identify a subscriber of mobile device 100 and to personalize the mobile device 100, among other things. Without SIM 126, mobile device 100 may not be fully operational for communication with network 200. By inserting SIM 126 into SIM interface 128, a subscriber may access all subscribed services. Services may include, without limitation: web browsing and messaging such as e-mail, voice mail, Short Message Service (SMS), and Multimedia Messaging Services (MMS). More advanced services may include, without limitation: point of sale, field service and sales force automation. SIM 126 may include a processor and memory for storing information. Once SIM 126 is inserted in SIM interface 128, it may be coupled to microprocessor 102. In order to identify the subscriber, SIM 126 may contain some user parameters such as an International Mobile Subscriber Identity (IMSI). By using SIM 126, a subscriber may not necessarily be bound by any single physical mobile device. SIM 126 may store additional subscriber information for a mobile device as well, including date book (or calendar) information and recent call information.

Mobile device 100 may be a battery-powered device and may comprise a battery interface 132 for receiving one or more rechargeable batteries 130. Battery interface 132 may be coupled to a regulator (not shown), which assists battery 130 in providing power V+ to mobile device 100. Although current technology makes use of a battery, future technologies such as micro fuel cells may provide power to mobile device 100. In some embodiments, mobile device 100 may be solar-powered.

Microprocessor 102, in addition to its operating system functions, enables execution of software applications on mobile device 100. A set of applications that control basic device operations, including data and voice communication applications, may be installed on mobile device 100 during its manufacture. Another application that may be loaded onto mobile device 100 is a personal information manager (PIM). A PIM may have functionality to organize and manage data items of interest to a subscriber, such as, but not limited to, e-mail, calendar events, voice mails, appointments, and task items. A PIM application may have the ability to send and receive data items via wireless network 200. PIM data items may be seamlessly integrated, synchronized, and updated via wireless network 200 with the mobile device subscriber's corresponding data items stored and/or associated with a host computer system. This functionality may create a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 may enable a subscriber to set preferences through an external device or software application, and extend the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 may provide for communication between mobile device 100 and different systems or devices, without the use of network 200. For example, subsystem 122 may include an infrared device and associated circuits and components for short-range communication. Examples of short-range communication include standards developed by the Infrared Data Association (IrDA), Bluetooth®, and the 802.11 family of standards (Wi-Fi®) developed by IEEE.

In use, a received signal such as a text message, an e-mail message, or web page download may be processed by communication subsystem 104 and input to microprocessor 102. Microprocessor 102 then processes the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary I/O subsystem 112 may include devices such as: a touch screen, mouse, track ball, infrared fingerprint detector, or a roller wheel with dynamic button pressing capability. Keyboard 116 may comprise an alphanumeric keyboard and/or telephone-type keypad, for example. A composed item may be transmitted over network 200 through communication subsystem 104.

For voice communications, the overall operation of mobile device 100 may be substantially similar, except that the received signals may be processed and output to speaker 118, and signals for transmission may be generated by microphone 120. Alternative voice or audio I/O subsystems, such as a voice message recording subsystem, may also be implemented on mobile device 100. Although voice or audio signal output may be accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 may comprise a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 may be dependent upon the network 200 in which mobile device 100 is intended to operate; thus, it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is generally a limited resource, typically due to limits in overall bandwidth and limited battery power of mobile device 100.

When mobile device 100 is fully operational, transmitter 152 may be typically keyed or turned on only when it is sending to network 200 and may otherwise be turned off to conserve resources. Similarly, receiver 150 may be periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with GPRS and GSM technologies; however, in other embodiments, different standards may be implemented as discussed in more detail above. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) server 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network; such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 may also contain a Packet Control Unit (PCU) 208 that connects to SGSN 216 to control segmentation, radio channel allocation and to satisfy packet switched requirements. To track mobile device location and availability for both circuit switched and packet switched management, HLR 212 may be shared between MSC 210 and SGSN 216. Access to VLR 214 may be controlled by MSC 210.

Station 206 may be a fixed transceiver station. Station 206 and BSC 204 together may form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile may be stored in HLR 212. HLR 212 may also contain location information for each registered mobile device and can be queried to determine the current location of a mobile device. MSC 210 may be responsible for a group of location areas, and may store the data of the mobile devices currently in its area of responsibility in VLR 214. Further, VLR 214 may also contain information on mobile devices that are visiting other networks. The information in VLR 214 may include part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times while requiring less use of computing resources.

SGSN 216 and GGSN 218 are elements that may be added for GPRS support; namely packet switched data support, within GSM. SGSN 216 and MSC 210 may have similar responsibilities within wireless network 200 by keeping track of the location of each mobile device 100. SGSN 216 also performs security functions and access control for data traffic on network 200. GGSN 218 may provide internetworking connections with external packet switched networks and connect to one or more SGSNs 216 via an Internet Protocol (IP) backbone network operated within the network 200. During normal operations, a given mobile device 100 may perform a "GPRS Attach" to acquire an IP address and to access data services. This normally is not present in circuit switched voice channels as Integrated Services Digital Network (ISDN) addresses may be generally used for routing incoming and outgoing calls. Currently, GPRS capable networks may use private, dynamically assigned IP addresses, using a DHCP server 220 connected to the GGSN 218. There are many mechanisms for dynamic IP assignment, including the use of a combination of a Remote Authentication Dial-In User Service (RADIUS) server and a DHCP server, for example. Once the GPRS Attach is complete, a logical connection may be established from a mobile device 100, through PCU 208, and SGSN 216 to an Access Point Node (APN) within GGSN 218, for example. The APN may represent a logical end of an IP tunnel that can either access direct Internet compatible services or private network connections. The APN may also represent a security mechanism for network 200, insofar as each mobile device 100 is assigned to one or more APNs, and mobile devices 100 cannot generally exchange data without first performing a GPRS Attach to an APN that it has been authorized to use. The APN may be considered to be similar to an Internet domain name such as "myconnection.wireless.com".

Once the GPRS Attach is complete, a tunnel may be created and all traffic exchanged within standard IP packets using any protocol that can be supported in IP packets. This may include tunneling methods such as IP over IP as in the case with some IPSecurity (IPsec) connections used with Virtual Private Networks (VPN). These tunnels are also referred to as Packet Data Protocol (PDP) Contexts and there may be a limited number of these available in the network 200. To maximize use of the PDP Contexts, network 200 will run an idle timer for each PDP Context to determine if there is a lack of activity. When a mobile device 100 is not using its PDP Context, the PDP Context may be deallocated and the IP address returned to the IP address pool managed by DHCP server 220.

Barcodes are optical, machine-readable representations of data. Barcodes are commonly provided as images printed on physical media, to be subsequently read using a scanning device that is configured to capture the images for further processing (e.g. by appropriate software and/or hardware coupled to the scanning device). In the course of further processing, the data represented by the barcode is decoded.

The form of data representation used in a barcode is commonly called the symbology, A barcode symbology may represent data in the width and spacing of parallel lines, in which case the barcode may be referred to as a one-dimensional (1D) barcode. Examples of 1D barcode symbologies may include Universal Product Code (UPC), Codabar, European Article Number (EAN), and the like. Other barcode symbologies may employ two-dimensional (2D) patterns of squares, dots or other geometric patterns to represent data. Examples of common 2D barcode symbologies may include Datamatrix, Maxicode, Quick Response (QR) Code, Aztec Code, Semacode, and the like.

In implementations of at least one embodiment described herein, a barcode is generated by a first device, and displayed as an image on a display associated with the first device, to be subsequently read using a camera or other similar hardware component of a second device (e.g. a mobile device similar to mobile device 100 of FIG. 1). Further processing is subsequently performed at the second device (e.g. by appropriate software and/or hardware), so that the data represented by the barcode can be decoded. Accordingly, the barcode provides a medium for the transmission of data from the first device to the second device.

Depending on the desired application, different types of data may be transmitted from the first device to the second device. For example, barcodes may be used to facilitate the secure transmittal of security parameters (e.g. a personal identification number [PIN], where "personal" refers to or is somehow associated with the device, and/or a password) from the first device to the second device.

For example, the barcode may provide a medium for the transmission of data used to perform Bluetooth™ pairing between the first device and the second device in accordance with embodiments described herein.

The Bluetooth protocol is a voice and data wireless communication protocol commonly used for short-range communications between electronic devices. Some of the advantages presented by the Bluetooth protocol may comprise low power operation, low cost, device ubiquity and low processing requirements, Bluetooth-enabled devices typically connect and communicate with each other using local, ad hoc networks commonly referred to as piconets. Each piconet may comprise up to 8 devices and each device may concurrently belong to more than one piconet. Bluetooth devices may communicate using the unlicensed industrial, scientific and medical (ISM) band at 2.4 to 2.485 GHz and support data rates up to 1 Mbps for Bluetooth version 1.2, up to 3 Mbps for version 2.0+Enhanced Data Rate (ESR), and up to 24 Mbps for version 3.0+High Speed (HS). Future versions of the Bluetooth protocol may offer even higher data rates. Bluetooth devices may be identified by a unique network address that is assigned to each device (i.e., when it is manufactured), such as a medium access control (MAC) address.

In order to establish communications for the first time, Bluetooth devices engage in a connection process known as "pairing", a purpose of which is to establish a shared secret, commonly known as the link key. One common form of the link key is a PIN code, which may be an ASCII string up to 16 characters in length, for example. Many devices employ a simple numeric PIN code, such as a 4-digit PIN code for example, which is frequently fixed or hard-coded into the device (i.e., 0000, 1234, etc.). In particular, devices that lack significant processing ability or input means are likely to have fixed PIN codes (e.g., headset or digital picture frame).

Generally, a first device may initiate Bluetooth pairing by searching for one or more devices that are within range and in a discoverable mode, in known manner. Upon performing the search, the first device detects any Bluetooth devices that are within range and in a discoverable mode. In addition to announcing its presence, a discoverable device will typically also provide an indication of its type (e.g., headset, phone, etc.). In some situations, there may be many discoverable devices within range, requiring a user to select the desired device from a long list. For each pair of devices, the devices may attempt to establish a connection, which may require the use of a PIN to authenticate the endpoints of the connection.

For example, if a fixed PIN is associated with the first device, a user of the second device may enter the PIN code associated with the first device into the second device. Upon receiving the correct PIN code, the second device is able to successfully authenticate the first device and the devices establish a communication link, in order to complete the Bluetooth pairing. In the above example, the first device is the searching device, and the second device is the located device. However, in some implementations, the PIN associated with a located device may be entered at the searching device.

The present inventors recognized that the use of a fixed PIN code may reduce the security of the pairing process, since the PIN code may be common and widely known (e.g., 0000) or otherwise easy to determine. Consequently, when a device with such a fixed PIN code enters pairing mode, an attacker might easily guess the PIN and pair with the device. Newer versions of the Bluetooth protocol have introduced more secure pairing methods relying on public key cryptographic techniques, however these methods typically require increased processing power. Certain devices, however, may not be equipped to provide significant processing capability.

The present inventors also recognized that in certain situations, devices that lack the processing power to perform public key cryptography, or that lack input mechanisms to receive PIN codes, might nevertheless be made capable of generating and transmitting variable PIN codes for use in pairing. For example, in at least one embodiment described herein, devices with an associated display may show an image of a "current" device PIN code, which is not fixed, for use in the pairing process.

Accordingly, at least some embodiments described herein provide for the use of non-fixed PIN codes. These may be employed in devices with limited processing power and input capability. In at least one embodiment, a random or pseudorandom PIN code may be generated by a first device, and transmitted to the second device via a channel other than Bluetooth communication. For example, the PIN code may be displayed on a display associated with the first device. Furthermore, the PIN code may be encoded in a barcode. A device equipped with a barcode scanner and the appropriate software and/or hardware can then capture and decode the barcode to recover the PIN code, thus relieving users of the need to transcribe the PIN code. As the PIN code is encoded in a barcode image, it may also make it more difficult for an attacker to detect it surreptitiously by, for example, "over-the-shoulder" snooping.

In accordance with at least some embodiments described herein, the network address of the first device may also be encoded in the barcode, which may simplify the discovery and pairing process, by relieving the user of the second device from the need to select the desired first device from a list of available devices that are in range, for example.

Embodiments described herein are generally directed to methods and devices in which devices may exchange Bluetooth pairing data via a barcode.

In one broad aspect, there is provided a method of performing Bluetooth pairing on a device, the method performed by a processor of the device, the method comprising: generating a barcode that encodes pairing data, the pairing data comprising a Bluetooth address and a personal identification number both associated with the device and usable to complete a Bluetooth pairing; transmitting the barcode; and performing the Bluetooth pairing after receiving a response.

In another broad aspect, the transmitting the barcode comprises displaying the barcode on a display associated with the device.

In another broad aspect, the method further comprises terminating said transmitting upon receiving the response by terminating display of the barcode on the display.

In another broad aspect, the method further comprises: receiving a message that confirms receipt of the barcode; and terminating said transmitting in response to the message.

In another broad aspect, the method further comprises generating the personal identification number.

In another broad aspect, the device comprises a photo frame.

In another broad aspect, the device comprises a mobile device.

In another broad aspect, there is provided a device comprising a memory, a Bluetooth transceiver, and further comprising a processor, wherein the processor is configurable to: generate a barcode that encodes pairing data, the pairing data comprising a Bluetooth address and a personal identification number both associated with the device and usable to complete a Bluetooth pairing; transmit the barcode; and perform the Bluetooth pairing after receiving a response.

In another broad aspect, there is provided a computer-readable storage medium upon which a plurality of computer-readable instructions for execution by a processor of a device is stored, wherein execution of the instructions causes the processor to: generate a barcode that encodes pairing data, the pairing data comprising a Bluetooth address and a personal identification number both associated with the device and usable to complete a Bluetooth pairing; transmit the barcode; and perform the Bluetooth pairing after receiving a response.

In another broad aspect, there is provided a method for performing Bluetooth pairing on a device, the method performed by a processor of the device, the method comprising: receiving a barcode comprising pairing data, the pairing data comprising a Bluetooth address and a personal identification number usable to complete a Bluetooth pairing; decoding the barcode to obtain the pairing data; and performing the Bluetooth pairing using the pairing data.

In another broad aspect, the receiving the barcode comprises using a camera associated with the device, where the camera is configured to capture an image comprising the barcode.

In another broad aspect, the method further comprises, prior to said decoding, processing the image to identify the barcode.

In another broad aspect, the barcode further comprises pairing initiation data, and wherein the method further comprises: automatically initiating said performing if the barcode comprises the pairing initiation data.

In another broad aspect, the barcode further comprises pairing initiation data, and wherein the method further comprises: prompting for an indication at the user interface that an act of Bluetooth pairing is to be initiated, if the barcode comprises the pairing initiation data; receiving the indication; and initiating said performing in response to receiving the indication.

In another broad aspect, the method further comprises sending a message after receiving the barcode, said message configured to indicate receipt of the barcode.

In another broad aspect, the device comprises a photo frame.

In another broad aspect, the device comprises a mobile device.

In another broad aspect, there is provided a device comprising a memory, a Bluetooth transceiver, and further comprising a processor, wherein the processor is configurable to: receive a barcode comprised of pairing data, the pairing data is further comprised of a Bluetooth address and a personal identification number usable to complete a Bluetooth pairing; decode the barcode to obtain the pairing data; and perform the Bluetooth pairing using the pairing data.

In another broad aspect, there is provided a computer-readable storage medium upon which a plurality of computer-readable instructions for execution by a processor of a device is stored, wherein execution of the instructions causes the processor to: receive a barcode comprised of pairing data, the pairing data further comprised of a Bluetooth address and a personal identification number usable to complete a Bluetooth pairing; decode the barcode to obtain the pairing data; and perform the Bluetooth pairing using the pairing data at the transmitting, the barcode is transmitted to the second device by displaying the barcode on a display associated with the first device.

These and other aspects and features of various embodiments will be described in greater detail below.

Figure 4:
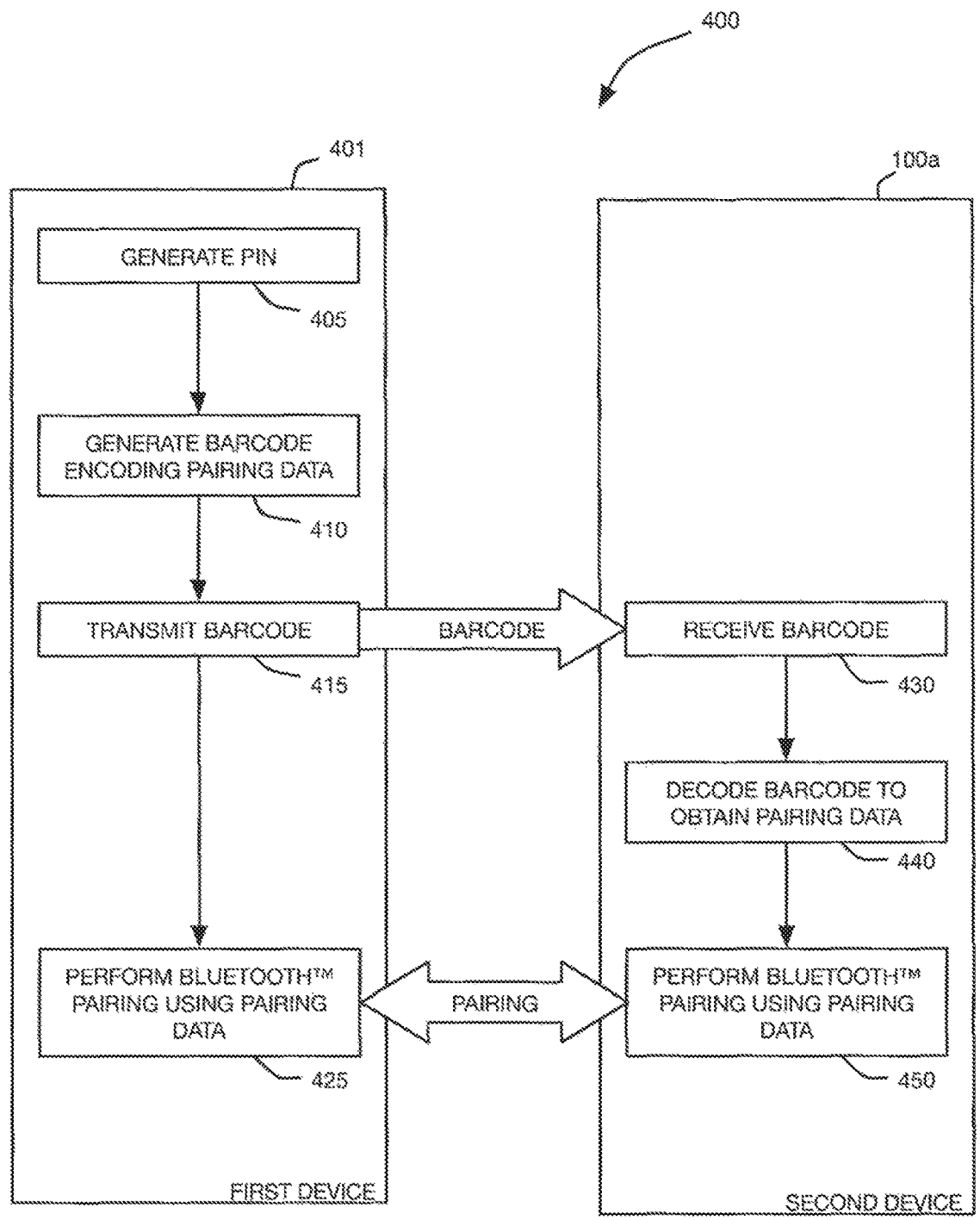
FIG. 4 is a flowchart illustrating acts of a method of Bluetooth pairing, in accordance with at least one embodiment.

Reference is first made to FIG. 4, in which a flowchart illustrating acts of a method of Bluetooth pairing is shown generally as 400, in accordance with at least one embodiment.

In at least one embodiment, acts 405 to 425 of method 400 are performed by a processor residing on a first device 401. The processor may be configured to perform the acts of method 400 by executing an application (e.g. comprising one or more application modules). First device 401 also comprises a memory (e.g., random access memory, Flash memory, etc.) and a Bluetooth communication interface. In some embodiments, the first device 401 may be, for example, a digital photo or picture frame, a digital billboard or sign, electronic advertising display, instrumentation panel, information display, or the like. In variant embodiments, the first device 401 may comprise, for example, a mobile device, a personal computer, or other device equipped with a display. However, for greater certainty, first device 401 need not be a "computing" device.

At 405, the first device generates a personal identification number (PIN) code. The PIN code may be selected according to a random or pseudorandom number generation algorithm. The PIN code may comprise characters from a pre-defined set of allowable characters. The set of allowable characters may differ depending on the position of a given character within the PIN code.

In a variant embodiment, the PIN code may be selected from a predefined list of PIN codes. For example, the first device may have stored in memory an array of random PIN codes arranged in an ordered or arbitrary manner. Thus, when choosing a PIN code, the first device may keep track of the last PIN code selected, such that the selected PIN code differs for each pairing attempt, By ensuring that the array of PIN codes is long enough, the first device may simulate a random PIN code selection.

In at least some embodiments, the PIN code may be automatically generated when the first device is powered on. In some embodiments, the PIN code may be automatically re-generated when the first device is "reset" in response to some user action, such as, for example, pressing a reset button, or in response to some other event, such as a disconnection of the device from an electrical power source. In some embodiments, the PIN code may be automatically generated for every new Bluetooth pairing attempt.

In some variant embodiments, if the first device is equipped with an input mechanism, a user may enter a PIN code in lieu of generation by the first device. Accordingly, the PIN code need not be fixed (e.g., 0000) for every pairing attempt.

Figure 7:
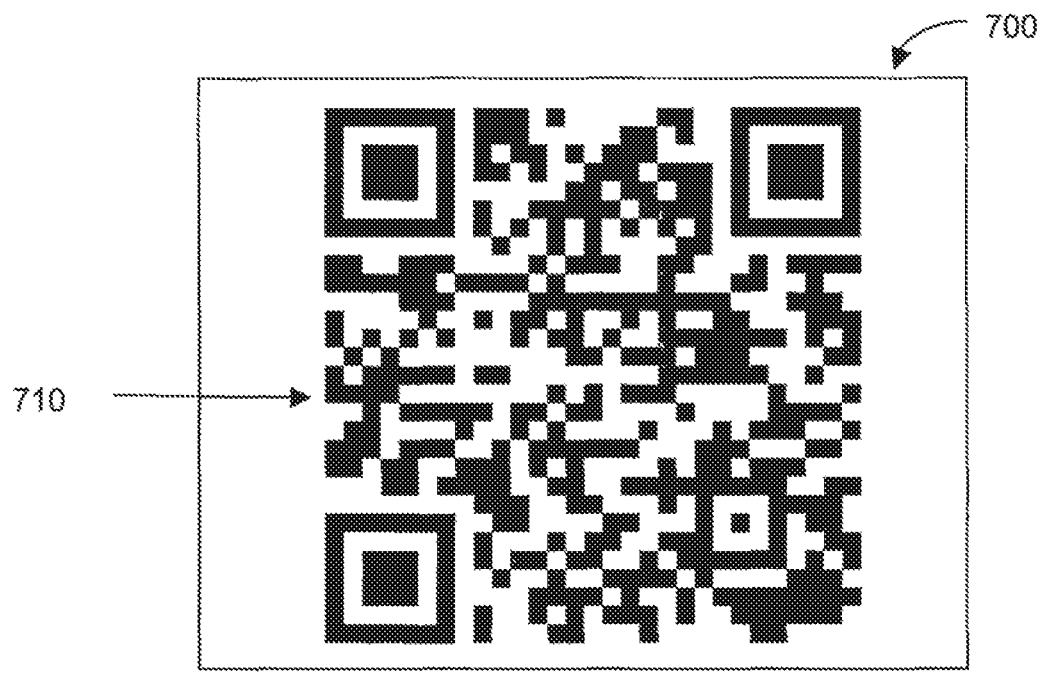
FIG. 7 is an example screen capture of the display of a first device as it displays a barcode for transmission to one other second device in the example implementation.

At 410, first device 401 encodes Bluetooth pairing data, comprising the PIN code generated at 405, in a barcode. A known barcode encoding technique may be employed. In at least some embodiments, the Bluetooth pairing data further encodes the network address of the first device (e.g., MAC address). In at least one embodiment, the barcode comprises a 2-dimensional barcode represented by squares, dots, and/ or other geometric patterns (see e.g. barcode 710 in a display 700 of FIG. 7). However, in variant embodiments, a different type of barcode may be generated at 410.

In at least one embodiment, the barcode comprises a black-and-white barcode. For illustrative purposes, examples are described herein where the barcode is a black-and-white barcode. However, persons skilled in the art will understand that barcodes employing different color combinations may be generated in variant embodiments.

In at least some embodiments, first device 401 generates an image comprising the generated barcode in a raster image format, such as Graphics Interchange Format (GIF), Portable Network Graphics (PNG), Joint Photographic Experts Group (JPEG) or Tagged Image File Format TIFF. However, in variant embodiments, the generated image may be in a scalable vector format, such as Scalable Vector Graphics (SVG). In variant embodiments, other image formats may be employed. For example, any format that first device 401 can then later use for display may be employed, including any proprietary format that the first device 401 uses internally to represent image data.

In some embodiments, the generation of the PIN code, barcode and image at 405, 410 may be initiated by user input to the first device 401. For example, user input may be provided via a user interface. In at least one embodiment, first device 401 may be a digital picture frame equipped with a Bluetooth communication interface. Accordingly, prior to 405, the digital picture frame may be placed in Bluetooth pairing mode by a user depressing a button on the device 401. Upon detecting the button press, the first device 401 proceeds to perform act 405. In variant embodiments, generation of the PIN code, barcode and image may be triggered by some other event. In some variant embodiments, the first device 401 may be equipped with a switch or other input mechanism to initiate Bluetooth pairing in accordance with a method described herein. In still other embodiments, the input mechanism may be a soft key or software user interface element.

At 415, the barcode image generated at 410 is transmitted to a second device 100a, which may be a mobile device, such as mobile device 100 of FIG. 1. In at least some embodiments, the barcode may be transmitted by displaying the image on a display associated with first device 501. The display may be either integrated with, or operatively coupled to, first device 501. In at least some embodiments, first device 501 is a digital picture frame. Accordingly, the image may be displayed on the display of the digital picture frame.

After waiting for the second device 100a to receive and decode the barcode and transmit Bluetooth pairing data, at 425, first device 401 verifies that second device 100a has transmitted the correct PIN code corresponding to the PIN code generated by first device 401, and continues the Bluetooth pairing process with second device 100a in known manner. Multiple exchanges of data may be required in the pairing process.

In at least one embodiment, acts 430 to 450 are performed by a processor executing an application (e.g.; comprising one or more application modules) residing on a second device 100a, such as mobile device 100 of FIG. 1. In variant embodiments, the application may reside on a computing device other than a mobile device.

Reference is now made to acts performed at the second device 100a, as illustrated in FIG. 4. In at least some embodiments, second device 100a has a Bluetooth pairing application stored in its memory. A user may launch the application, which may provide an option, in a user interface of the second device 100a, for the user to scan (e.g., using a camera associated with the device) a barcode that encodes pairing data specifically for initiating Bluetooth pairing.

At 430, second device 100a receives the image comprising the barcode and extracts the barcode. In at least some embodiments, the image is captured via a camera (e.g. camera unit 148 of FIG. 1) or other optical sensing device associated with second device 100a. The camera or other optical sensing device may be built into the second device itself, or it may be a physically separate device operatively coupled to the second device. The camera or other optical sensing device is configured to provide captured data to the processor, for example, in order to extract the barcode and decode the data represented in the barcode. Extraction of the barcode may require processing the captured image to isolate the barcode by removing image noise and artifacts, surrounding background data, and performing other image processing, such as de-skewing, as will be known to those skilled in the art.

At 440, second device 100a decodes the barcode to obtain the Bluetooth pairing data comprising the PIN code. In at least some embodiments, the Bluetooth pairing data further comprises the network address of first device 401.

At 450, second device 100a transmits Bluetooth pairing data, which depends in part on the PIN code initially generated by first device 401 and decoded from the barcode received at the second device 100a, to first device 401, and carries out Bluetooth pairing in known manner. Multiple exchanges of data may be required in the pairing process.

Figure 5:
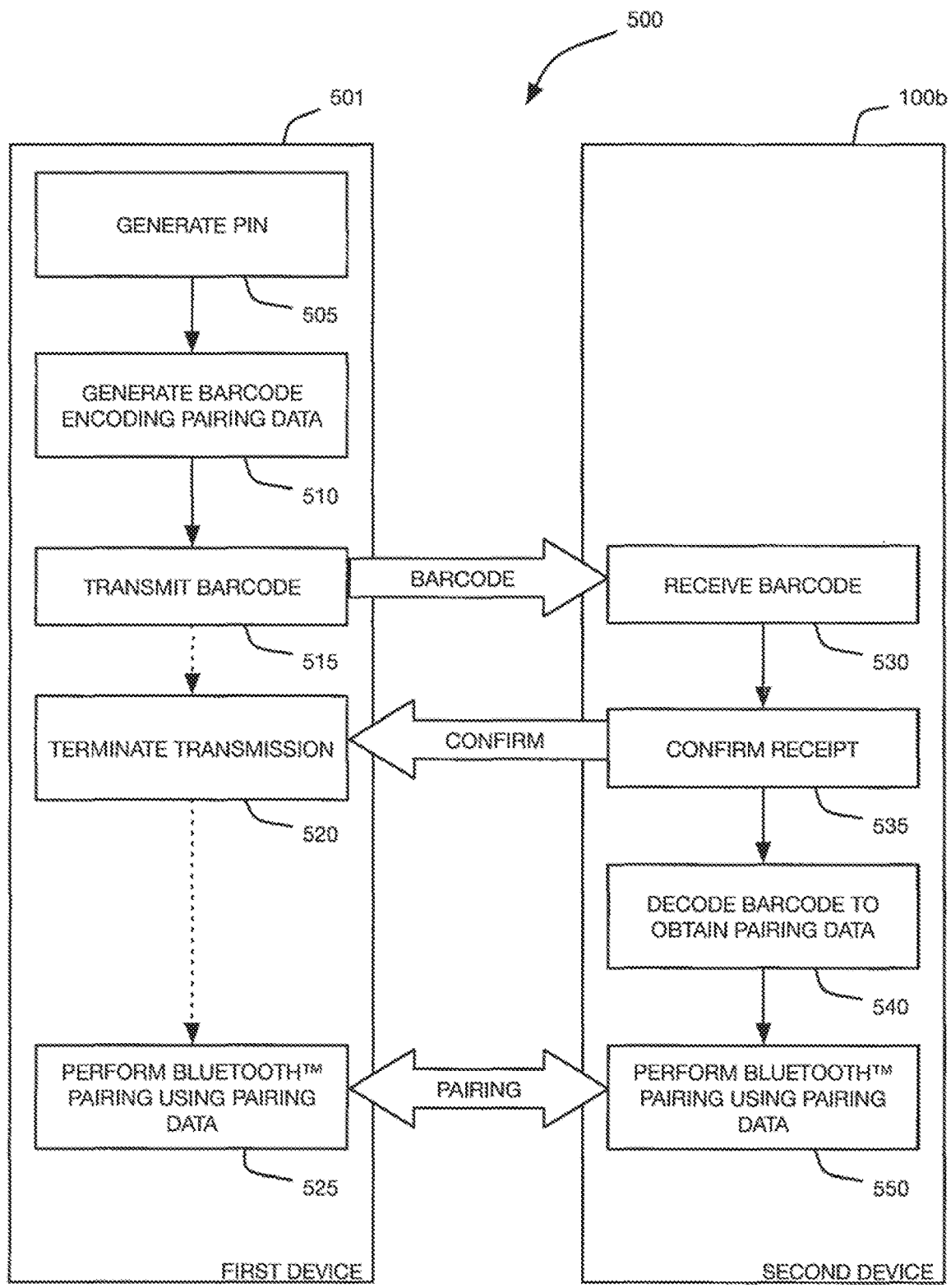
FIG. 5 is a flowchart illustrating acts of a method of Bluetooth pairing, in accordance with at least one other embodiment.

In accordance with at least one other embodiment, FIG. 5 illustrates acts of a method 500 that are generally analogous to the acts of method 400 of FIG. 4. In particular, acts 505 to 515, 525, 530, 540 and 550 of method 500 are generally analogous to acts 405 to 415, 425, 430, 440 and 450 of method 400, respectively, and the reader is directed to the foregoing description in respect of FIG. 4 for further details of the acts illustrated in FIG. 5. Likewise, first device 501 is analogous to first device 401, and second device 100b is analogous to second device 100a.

Method 500 differs from method 400 in that, at 520, first device 501 may automatically terminate transmission (e.g. display) of the barcode image upon receipt of a confirmation message from second device 100b.

For example, at 535, second device 100b determines if it has received a complete image comprising a barcode. If the image and barcode appear to be complete and uncorrupted, second device 100b sends a confirmation message to first device 501 indicating successful receipt of the barcode. The confirmation message may be in the form of a broadcast Bluetooth message comprising a predetermined code, such as a digest or hash code formed from the image data. However, the confirmation message merely provides confirmation that second device 100b has received a barcode, but provides no guarantee that the pairing is expected to be successful.

Figure 6:
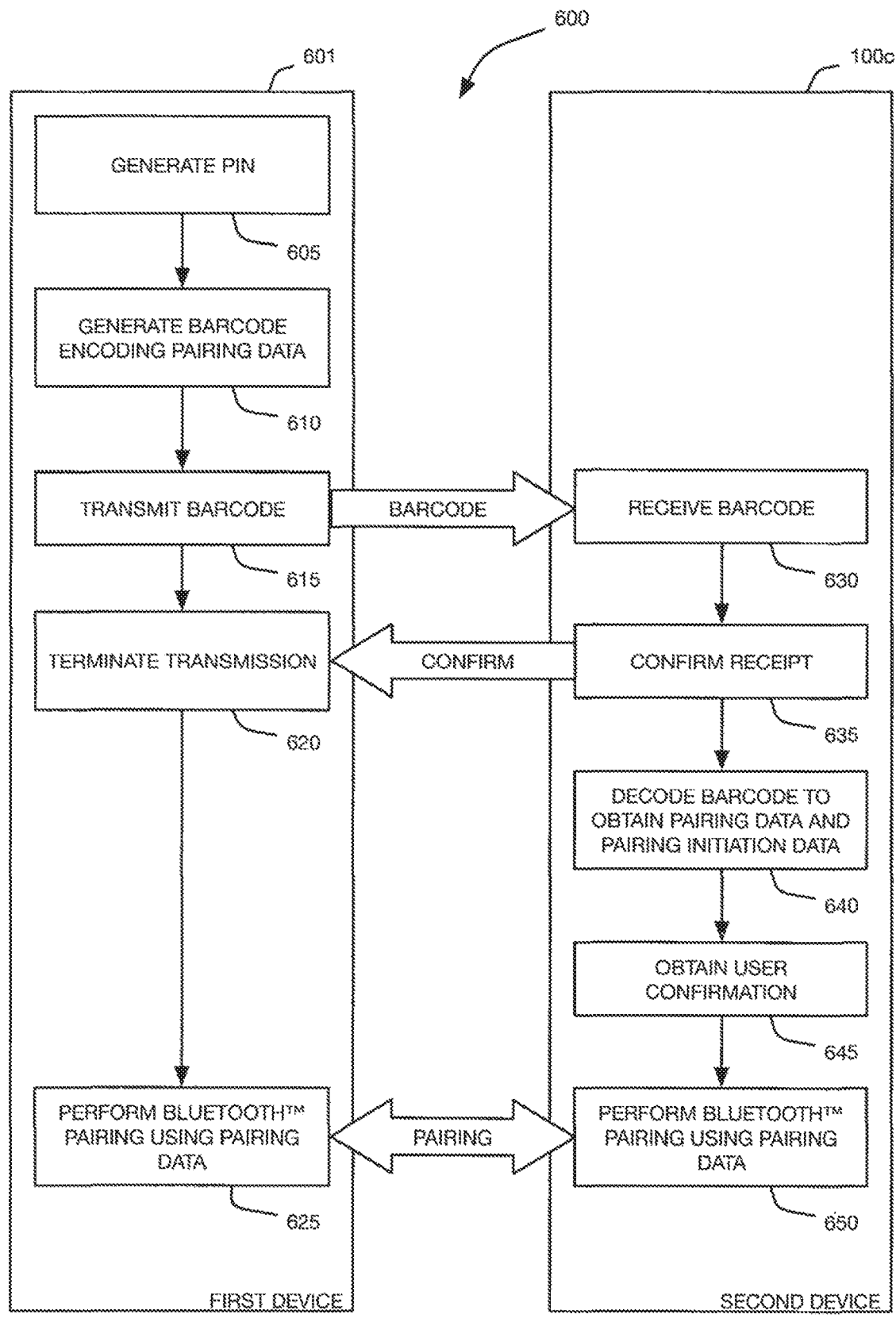
FIG. 6 is a flowchart illustrating acts of a method of Bluetooth pairing, in accordance with at least one other embodiment.

In accordance with at least one other embodiment, FIG. 6 illustrates acts of a method 600 that are generally analogous to the acts of method 500 of FIG. 5. In particular, acts 605 to 640 and 650 of method 600 are generally analogous to acts 505 to 540 and 550 of method 500, respectively, and the reader is directed to the description in respect of FIG. 5 for further details of the acts illustrated in FIG. 6. Likewise, first device 601 is analogous to first device 501, and second device 100c is analogous to second device 100b.

In at least some embodiments, acts 620 and 635 of method 600 may not be performed.

As previously noted, a second device may have a Bluetooth pairing application stored in its memory in some embodiments. A user may launch the application, which may provide an option, in a user interface of the second device, for the user to scan (e.g., using a camera associated with the device) a barcode that encodes pairing data specifically for initiating Bluetooth pairing. The user may choose to use this application when the user expects that a barcode being displayed encodes Bluetooth pairing data.

However, there may be situations in which a user (e.g. of second device 100c) may encounter a barcode, but it may not be readily discernible to the user upon visual inspection of the barcode that the barcode comprises Bluetooth pairing data.

Some devices may be equipped with a general-purpose barcode scanning application stored in its memory. The general-purpose barcode scanning application may be used to scan (e.g., using a camera associated with the device) a variety of barcodes with different purposes. For example, the device may be configured to scan a barcode on a book, enabling the device to perform an ISBN lookup and provide the user opportunity to purchase a similar book. Alternatively, the device may scan a barcode on an inventory item as part of a cataloging process. These examples are provided by way of illustration only.

Some other devices may be equipped with a camera application stored in its memory for capturing video or still images (e.g., using a camera associated with the device). The camera application may allow a device to be configured to detect when a particular captured image comprises a barcode.

In accordance with at least one embodiment, pairing initiation data may be encoded in a barcode transmitted at 615. The pairing initiation data may identify one or more types of data that is encoded within the barcode, for example Bluetooth pairing data. This may allow the device to take appropriate actions to process the Bluetooth pairing data, such as launching a Bluetooth pairing application, even if the pairing application was not launched by a user prior to the scanning of the barcode.

For example, a user may scan a barcode, but may not be initially aware or certain that the barcode specifically contains Bluetooth pairing data. If the barcode contains pairing initiation data and is scanned by the user's device (e.g. executing a general-purpose barcode scanning application or a camera application), the pairing initiation data may permit the device to automatically identify that that the barcode comprises Bluetooth pairing data, and to automatically process the Bluetooth pairing data accordingly, treating the scan of the barcode as a Bluetooth pairing request.

Referring to FIG. 6, act 610 differs from acts 410 and 510 in that first device 601 generates an image comprising a barcode that encodes pairing initiation data in addition to the Bluetooth pairing data. Pairing initiation data may comprise an identifier that identifies the barcode as being associated with a Bluetooth pairing request. For example, one, two or three (or more) alphanumeric characters may be encoded in the barcode to represent different types of requests. This may allow an appropriately configured device to automatically infer the type of request encoded in the barcode depending on the characters. A predefined identifier may be used as pairing initiation data to indicate that the barcode encodes Bluetooth pairing data and represents a Bluetooth pairing request. Accordingly, further processing steps to carry out Bluetooth pairing can be automatically initiated by a device that has captured and decoded the barcode.

At 615, first device 601 transmits the image comprising a barcode, wherein the barcode comprises pairing initiation data and Bluetooth pairing data.

At the second device 100c, at 630, the image comprising the barcode is captured. In at least some embodiments, the barcode may be captured during execution of a Bluetooth pairing application. However, in other embodiments, the barcode is captured during execution of a general-purpose barcode scanning application. In still other embodiments, the barcode is captured during execution of a camera application.

At 640, second device 100c decodes the barcode comprising the Bluetooth pairing data and pairing initiation data. Second device 100c determines whether the barcode encodes pairing initiation data, and whether the pairing initiation data identifies the barcode as relating to a Bluetooth pairing request. In embodiments where the barcode image was not captured during execution of a Bluetooth pairing application, second device 100c may determine that the barcode encodes pairing initiation data, and automatically initiate execution of a Bluetooth pairing application.

Optionally, device 100c may obtain user confirmation, at 645, before proceeding with Bluetooth pairing. This may be performed to ensure that the user wishes to proceed with the Bluetooth pairing process, and may be helpful particularly in situations where the user may not have initially been aware that the barcode being scanned comprised Bluetooth pairing data. Such confirmation may be obtained, for example, where the barcode contains pairing initiation data and where the barcode was not captured during execution of a Bluetooth pairing application, to avoid inadvertent pairing.

User confirmation may be obtained by, for example, generating a user interface prompt (e.g. "Pairing of this device with Device A is being requested, proceed?") and receiving user input confirming that the Bluetooth pairing process should be performed.

If user confirmation to proceed is obtained, Bluetooth pairing may be performed at 650 in known manner. Otherwise, method 600 may terminate at device 100c at 645.

Although at least some of the embodiments described herein contemplate the capture of a barcode at an electronic or computing device (e.g. a mobile device), in variant embodiments, the barcode may be captured at a device other than a computing device.

The examples provided herein have been described primarily with reference to the Bluetooth protocol. However, in variant embodiments, other similar protocols that employ pairing data to establish wireless connections between devices may be employed.

Some of the acts of a method of displaying a barcode in accordance with an embodiment described herein may be provided as software instructions stored on physical computer-readable storage media and executable by a processor.

In variant implementations, some of the acts of a method of displaying a barcode in accordance with an embodiment described herein may be provided as executable software instructions stored in transmission media.

Furthermore, embodiments described herein have been described primarily with reference to devices (e.g. photo frames) comprising a display, or otherwise having a display associated therewith, in which the barcode may be displayed. However, in variant embodiments, other output devices capable of outputting a barcode by other means may be employed. For example, a first device may comprise a printer or a label machine, for example, which may be configured to print out a barcode on a physical medium (e.g. paper, label), wherein the printed barcode encodes pairing data for transmission to a second device. The second device may then scan the barcode, as previously described, to obtain the pairing data and initiate Bluetooth pairing with the first device.

A number of embodiments have been described herein. However, it will be understood by persons skilled in the art that other variants and modifications may be made without departing from the scope of the embodiments as defined in the claims appended hereto.

The invention claimed is:

1. A method for short-range communication pairing, the method comprising:
    at a processor of a first communication device, receiving an optical representation of security parameters associated with a second communication device and usable to complete a short-range communication pairing with the second communication device;
    decoding the optical representation at the processor, to obtain the security parameters; and
    automatically performing the short-range communication pairing using the security parameters, in response to obtaining the security parameters from the optical representation.

2. The method of claim 1, wherein receiving the optical representation comprises controlling, by the processor, a camera associated with the first communication device to capture an image of the optical representation.

3. The method of claim 2, further comprising, prior to the decoding, processing the image to identify the optical representation.

4. The method of claim 1, further comprising sending a message to the second communication device after receiving the optical representation to indicate receipt of the optical representation.

5. The method of claim 1, wherein the first communication device comprises a photo frame.

6. The method of claim 1, wherein the first communication device comprises a mobile device.

7. The method of claim 1, wherein the optical representation is a barcode.

8. A communication device, comprising:
    a memory;
    a short-range communication transceiver; and
    a processor configured to:
        receive an optical representation of security parameters associated with a second communication device and usable to complete a short-range communication pairing with the second communication device;
        decode the optical representation at the processor, to obtain the security parameters; and
        in response to obtaining the security parameters from the optical representation, automatically perform the short-range communication pairing using the security parameters.

9. The communication device of claim 8, further comprising a camera; wherein the processor is configured, in order to receive the optical representation, to control the camera to capture an image comprising the optical representation.

10. The communication device of claim 9, wherein the processor is configured to process the image to identify the optical representation prior to decoding the optical representation.

11. The communication device of claim 8, wherein the processor is configured to send a message after receiving the optical representation, to indicate receipt of the optical representation.

12. The communication device of claim 8, wherein the communication device is a photo frame.

13. The communication device of claim 8, wherein the communication device is a mobile device.

14. A non-transitory computer-readable storage medium including a plurality of computer-readable instructions for execution by a processor of a communication device to:
    receive an optical representation of security parameters associated with a second communication device and usable to complete a short-range communication pairing with the second communication device;
    decode the optical representation at the processor, to obtain the security parameters; and
    in response to obtaining the security parameters from the optical representation, automatically perform the short-range communication pairing using the security parameters.

15. The non-transitory computer-readable storage medium of claim 14, wherein execution of the instructions by the processor configures the processor, in order to receive the optical representation, to control a camera to capture an image comprising the optical representation.

16. The non-transitory computer-readable storage medium of claim 15, wherein execution of the instructions by the processor configures the processor to process the image to identify the optical representation prior to decoding the optical representation.

17. The non-transitory computer-readable storage medium of claim 14, wherein execution of the instructions by the processor configures the processor to send a message after receiving the optical representation, to indicate receipt of the optical representation.

18. The non-transitory computer-readable storage medium of claim 14, wherein the communication device is a photo frame.

19. The non-transitory computer-readable storage medium of claim 14, wherein the communication device is a mobile device.

20. The non-transitory computer-readable storage medium of claim 14, wherein the optical representation is a barcode.

* * * * *